(No Model.)
W. L. HORNE.
VACUUM DISTILLATION.
No. 386,747. Patented July 24, 1888.
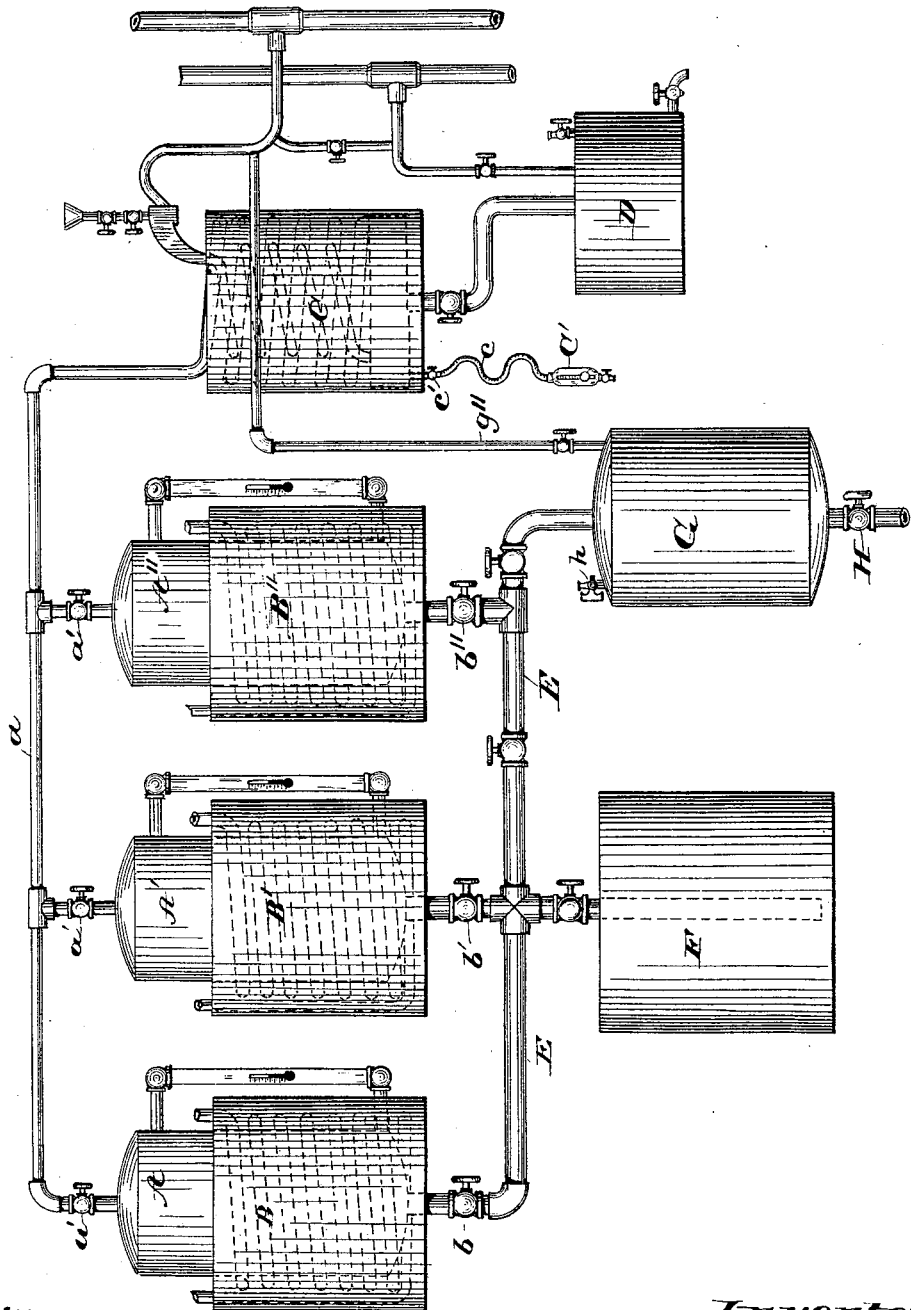
Witnesses:
E. H. Walker.
S. W. Whitaker.
Inventor.
W. L. Horne.
By his attys
Whitaker & Prinn.

UNITED STATES PATENT OFFICE.

WILLIAM L. HORNE, OF MERIDEN, ASSIGNOR TO THE HORNE VACUUM COMPANY, OF HARTFORD, CONNECTICUT.

VACUUM-DISTILLATION.

SPECIFICATION forming part of Letters Patent No. 386,747, dated July 24, 1888.

Application filed February 1, 1887. Renewed March 29, 1888. Serial No. 268,845. (No model.)

*To all whom it may concern:*

Be it known that I, WILLIAM L. HORNE, a citizen of the United States, residing at Meriden, in the county of New Haven and State of Connecticut, have invented certain new and useful Improvements in Vacuum-Distillation; and I do hereby declare the following to be a full, clear, and exact description of the invention, such as will enable others skilled in the art to which it appertains to make and use the same.

My invention relates to vacuum-distilling apparatus; and the object of the same is to facilitate the distilling operations by such an arrangement of parts as will provide for the introduction of new material for the process into the apparatus and the removal of the residuals without destroying the vacuum in the vessels in which the distillation or vaporization takes place.

One form of my invention is shown in the accompanying drawing and described in the following specification, the invention being particularly pointed out in the claims.

In the drawing I have represented one form or arrangement of apparatus to carry my invention into effect.

A A' A'' are the vessels in which the operation of distillation takes place, and B B' B'' the means for maintaining or increasing the temperature of the liquid in said vessels, which in this case are water-tanks with steam or hot-water coils located therein, as shown in my former application for patent, Serial No. 217,697.

C is the condenser, which may be of any desired size. This condenser has a pipe, $a$, connected therewith, and each of said distilling-vessels is connected with this pipe by a short pipe, $a'$, in which is a stop-cock. The condenser C is connected with an air-exhausting apparatus, which may be a vacuum-pump or any other device capable of forming an approximate vacuum in the distilling-vessels, in the manner shown in my former application for patent, hereinbefore referred to. The condenser is of the same form as that shown in my former application, and has the same construction, whereby the products of the distillation can be withdrawn from the condenser without discontinuing the operation of the distilling apparatus. This consists of the vessel D and its connections. Pipes $b$ $b'$ $b''$ connect the bottom of the distilling-vessels and a pipe, E. This pipe E is connected with the reservoir F by pipe $f$, and by pipe $g$ with the tank G. Pipes E, $b$, $b'$, $b''$, $f$, and $g$ are provided with cocks, as shown. The tank G is connected with an air-exhausting apparatus by pipe $g''$, and has also connected therewith draw-off pipe H and air-pipe $h$.

I prefer to provide each of the distilling-vessels A A' A'' with a glass gage-pipe, J, communicating with such vessels at top and bottom, and each of said vessels is also provided with a thermometer. I prefer to place the same in the gage-pipe J; but that is not necessary, as it may be placed in any other connection with the said vessels. This gage-pipe enables the operator to see the condition of the material within the distilling-vessels, and to see when vaporization takes place and to watch the progress of the same.

With the bottom of the condenser I connect a glass vessel, C', by a flexible tube, $c$, in which is placed an alcoholometer. The flow of the distillate into this receptacle is controlled by a cock, $c'$, in close proximity to the condenser. A support for the vessel C' when not in use may be attached to the condenser. Whenever desired, the vessel may be lowered to a proper position, the controlling-cock opened, and the distillate tested by the alcoholometer.

It will be apparent that one or more of the distilling-vessels A A' A'' may be in connection with the condenser at the same time. The supply tank or reservoir F is supplied with the liquid which it is proposed to distill, and the distilling-vessels are filled from it, when desired, through pipe E. The connection of the distilling-vessels A A' A'' with pipe E is normally closed, and when it is desired to fill any one of them a cock in pipe E, between such distilling-vessel and the tank G, is closed and the cocks between the distilling-vessel and the supply-tank F are opened, when the liquid in said tank will flow into the distilling-vessel without impairing the vacuum therein. For instance, suppose it is desired to fill the distilling-vessel A. The cocks in pipes $b$ $b'$ $b''$ are all closed, the cock in pipe E, between the distilling-vessels A' and A", is closed, and the cock F and the cock in pipe b" are opened. The liquid in the tank will then flow through the pipe-connections into the vessel A.

If it is desired to fill the distilling-vessel A" under the same conditions, the cock in the pipe E, between that receptacle and the tank G, is closed, and the cocks f and the cock in pipe b" and the cock in the pipe E, between receptacles A' A", opened, when the liquid will flow into receptacle A".

In case it is desired to draw off the residual liquor from any one of the distilling-vessels A A' A", its connection with pipe a is closed, a vacuum is created in tank G, and the connection between the distilling-receptacle and the tank G opened, and the cock f closed, when the residual liquor will flow into tank G. The residual liquor can be removed from the tank G by closing its connection with pipe E and admitting air to said tank through pipe h, which is provided for this purpose. It will thus be seen that the distilling-receptacles can be filled with the liquor to be distilled, and the residual liquor drawn off without impairing the vacuum in such vessels or affecting the action of the condenser, so that one of the distilling receptacles can be filled or emptied without disturbing the operation of distilling in the others.

As explained in my former application for process and apparatus for distilling, the distillate can be drawn off from the condenser without impairing the vacuum in the apparatus or affecting the operation of distilling by means of the tank or vessel D and its connections. It will thus be seen that in the apparatus here shown and described after distillation has once commenced it may be made continuous and be carried on without stopping to empty and refill the distilling-vessels or to draw off the distillate, and then the necessity at each refilling of such vessels to again exhaust the air therefrom and again establish a vacuum therein is avoided.

Two condensers may be used instead of one; but I prefer to use one of sufficient capacity to effect the condensation desired. My construction enables me to use one condenser and to carry on the operation of distillation continuously in connection with two or more distilling-vessels.

I do not desire to limit myself to my exact construction, as changes therein may be made without departing from the spirit of my invention.

What I claim, and desire to secure by Letters Patent, is—

1. The combination, with two or more distilling-vessels, a condenser, and an air-exhausting device, of a supply-tank, a tank for receiving the residual liquor, a pipe connected with both of said tanks and with each of said distilling-vessels, and cocks controlling the connections between the different parts, substantially as described.

2. The combination, with two or more distilling-receptacles, a condenser, and a vacuum apparatus, of a supply-tank and a tank for receiving the residual liquor, said residual tank being connected with an air-exhausting apparatus, a pipe connected with the supply and residual tanks and with the distilling-vessels, and cocks controlling the connections with the different parts, substantially as described.

3. The combination, with two or more distilling-vessels, of a residual tank connected with said vessels, a condenser, also connected with said distilling-vessels, a distillate-tank connected with said condenser, an air-exhausting apparatus connected with the condenser and with the residual and distillate tanks, and cocks for controlling the connections with the different parts, substantially as described.

4. The combination, with two or more distilling-vessels, of a supply-tank, a tank for the reception of the residual liquor, a pipe connected with said tanks and with the said vessels, a condenser connected with the distilling-vessels, a distillate-tank connected with the condenser, an air-exhausting device connected with the condenser and distillate and residual tanks, and cocks controlling the connections with the different parts, substantially as described.

In testimony whereof I affix my signature in presence of two witnesses.

WM. L. HORNE.

Witnesses:
E. T. WALKER,
L. B. WHITAKER.